(12) United States Patent
Dybdal et al.

(10) Patent No.: US 7,373,105 B2
(45) Date of Patent: May 13, 2008

(54) METHOD OF DETERMINING COMMUNICATION LINK QUALITY EMPLOYING BEACON SIGNALS

(75) Inventors: Robert B. Dybdal, Palos Verdes Estates, CA (US); Michael A. Rolenz, Harbor City, CA (US)

(73) Assignee: The Aerospace Corporation, El Segundo, CA (US)

( * ) Notice: Subject to any disclaimer, the term of this patent is extended or adjusted under 35 U.S.C. 154(b) by 478 days.

(21) Appl. No.: 10/007,992

(22) Filed: Nov. 7, 2001

(65) Prior Publication Data

US 2003/0087606 A1 May 8, 2003

(51) Int. Cl.
*H04B 7/185* (2006.01)
*H04B 17/00* (2006.01)

(52) U.S. Cl. .......... 455/13.4; 455/13.1; 455/67.11; 455/12.1; 455/427; 343/703

(58) Field of Classification Search .......... 455/67.11, 455/67.14, 3.01, 12.1, 13.1–13.4; 370/317, 370/324; 343/703
See application file for complete search history.

(56) References Cited

U.S. PATENT DOCUMENTS

| | | | | |
|---|---|---|---|---|
| 4,776,035 A | * | 10/1988 | Duggan ........................ | 455/69 |
| 5,781,845 A | * | 7/1998 | Dybdal et al. ................ | 455/65 |
| 5,835,847 A | * | 11/1998 | Gilmore et al. ............. | 455/12.1 |
| 5,930,718 A | * | 7/1999 | Rydbeck et al. ............ | 455/458 |
| 5,946,603 A | * | 8/1999 | Ibanez-Meier et al. ..... | 455/13.1 |
| 6,021,309 A | * | 2/2000 | Sherman et al. ............ | 455/12.1 |
| 6,219,006 B1 | * | 4/2001 | Rudish ....................... | 343/895 |
| 6,326,922 B1 | * | 12/2001 | Hegendoerfer ........ | 343/700 MS |
| 6,356,744 B1 | * | 3/2002 | Zamat ........................ | 455/126 |
| 6,542,716 B1 | * | 4/2003 | Dent et al. ................. | 455/13.1 |
| 6,587,687 B1 | * | 7/2003 | Wiedeman .................. | 455/428 |
| 2002/0032002 A1 | * | 3/2002 | Wiedeman et al. ........ | 455/12.1 |
| 2002/0114398 A1 | * | 8/2002 | Lin et al. .................... | 375/253 |

OTHER PUBLICATIONS

R. B. Dybdal, "UHF SATCOM Antenna Architectures," *IEEE MILCOM 2000*, Oct. 25, 2000.

* cited by examiner

*Primary Examiner*—Lester G. Kincaid
*Assistant Examiner*—Matthew C Sams
(74) *Attorney, Agent, or Firm*—Henricks, Slavin & Holmes LLP (57) ABSTRACT

A method of determining communication link quality includes the steps of: providing communications stations (e.g., UHF communications satellites, base stations of a terrestrial cellular network) with beacon transmitters that are used to transmit two types of signals from each communications station; and providing a communications device that employs the communications stations with beacon receivers and the ability to process the two types of signals to provide a user of the communications device with a real time determination of link impairments and, from this, a determination of the type and quality of service that is available to the user. The first type of signal is a stable continuous wave (CW) tone that provides a reference signal level, and the second type of signal is a coded waveform with distinguishable correlation properties. In an exemplary preferred embodiment, a processor and display are integrated with the user's communication device and function to process these two signals and provide a user-friendly interface through which information pertaining to determined levels of link impairments and the type and quality of service available at that given location and time is communicated to the user. In an exemplary preferred embodiment, the user's communication device is also provided with a booster system with an alternative high-gain antenna to increase communications opportunities in difficult operating environments.

17 Claims, 5 Drawing Sheets

METHOD OF DETERMINING COMMUNICATION LINK QUALITY EMPLOYING BEACON SIGNALS

STATEMENT OF GOVERNMENT INTEREST

The invention was made with Government support under contract F04701-93-C-0094 by the Department of the Air Force. The Government has certain rights in the invention.

BACKGROUND OF THE INVENTION

1. Field of Invention

The present invention relates to a method of determining communication link quality employing beacon signals and, more particularly, a method of processing beacon signals from one or more communications stations to determine link quality between a communications device and the communications stations with the beacon signals including a continuous wave (CW) tone and a coded signal that are different for each of the communications stations.

2. Description of the Related Art

Satellite beacons are widely used at microwave frequencies for three applications. The first application is to use the satellite beacon in aligning the antenna with the satellite, i.e., an antenna-tracking beacon. The second application concerns operation at higher frequencies, e.g., Ku-band, where orthogonal linear polarization is used. In this application, typically two beacon frequencies provide signals that are orthogonally polarized and thus, afford a means of polarization alignment for the user to avoid cochannel interference that degrades system communications. The third application presents a stable signal for propagation research. In this application, signal level variations received by a monitoring station can be identified with propagation losses associated with rainfall, cloud cover, and other meteorological events that degrade high frequency signals.

The ultrahigh frequency (UHF) range of the radio spectrum is the band extending from 300 MHz to 3 GHz. The wavelengths corresponding to these limit frequencies are 1 meter and 10 centimeters. The UHF frequencies have link impairments that are not present at higher microwave frequencies, and by contrast, weather conditions that degrade communications at these higher frequencies do not degrade UHF frequencies. However, while higher frequency systems are degraded by principally a single factor, UHF systems are degraded by a variety of independent factors, or link impairments, that degrade communication performance.

It would be useful to be able to assist a user of a communications device, particularly a device that exploits UHF frequencies, in determining the type of service that can be achieved at a given location and time. It would also be useful to be able to provide a real time means for individually determining the factors that impair link performance and thus, allow the user to determine the type and quality of communications service that is available and assess changes in user locations that may enhance communication opportunities.

SUMMARY OF THE INVENTION

A method of determining communication link quality according to the present invention generally involves: providing a plurality of communications stations (e.g., UHF communications satellites, base stations of a terrestrial cellular network) with beacon transmitters that are used to transmit two types of signals from each communications station; and providing a communications device that communicates with the communications stations, the communications device having beacon receivers and the ability to process the two types of signals to provide a user of the communications device with a real time determination of link impairments and, from this, a determination of the type and quality of service that is available to the user. The first type of signal is a stable continuous wave (CW) tone that provides a reference signal level, and the second type of signal is a coded waveform. In an exemplary preferred embodiment of the present invention, a processor and display are integrated with the user's communication device and function to process these two signals and provide a user-friendly interface through which information pertaining to determined levels of link impairments and the type and quality of service available at that given location and time is communicated to the user.

In a preferred embodiment, the communications device is provided with means to determine link loss, scintillation effects, Doppler offsets, noise levels and interference, as well as means to control the transmitter signal level of the communications device. With this added functionality, the user is provided with means to understand the limitations of the existing communication capabilities and the user's transmission level is controlled to reduce the dynamic range of user signals received and processed by the satellite thereby increasing system effectiveness.

In accordance with one embodiment of the present invention, a method of determining communication link quality employing beacon signals includes the steps of: equipping a plurality of communications satellites with beacon transmitters that generate beacon signals including a continuous wave (CW) tone and a coded signal that are different for each of the communications satellites; and providing a communications device, that is capable of establishing UHF communications links with the communications satellites, with a mechanism for receiving and processing the beacon signals to determine the quality of the UHF communications links. According to a preferred method, for each of the communications satellites: the coded signal is within a communications bandwidth employed by the communications satellite; and the CW tone is out of the communications bandwidth. By way of example, the communication device is a transponder or mobile telephone. The mechanism for receiving and processing the beacon signals includes one or more beacon receivers, such as a continuous wave (CW) tone beacon receiver and a coded signal beacon receiver.

An exemplary preferred method of determining communication link quality employing beacon signals according to the present invention further includes the step of providing the communications device with a mechanism for communicating to a user information pertaining to the quality of the UHF communications links, for example, noise information, interference information and/or scintillation information. In a preferred embodiment, the mechanism for communicating information provides a real time indication of link quality. In a preferred embodiment, the mechanism for communicating information includes a display device operably interconnected to the communications device.

An exemplary preferred method of determining communication link quality employing beacon signals according to the present invention further includes the step of providing the communications device with a mechanism for adjusting a transmission power of the communications device. In a preferred embodiment, the mechanism for adjusting transmission power includes a booster device with an alternative high gain antenna, e.g., a log periodic antenna or a Yagi antenna. In a preferred embodiment, the alternative high gain antenna is articulated so that it can be manipulated as desired into an opened operating configuration or a collapsed storage configuration.

In accordance with another embodiment of the present invention, a method of determining communication link quality employing beacon signals includes the step of: employing one or more beacon receivers and a processor to receive and process beacon signals from one or more communications stations to determine link quality between the communications device and the communications stations, the beacon signals including a continuous wave (CW) tone and a coded signal that are different for each of the communications stations. In a preferred embodiment, the processor is programmed to process data pertaining to measured signal levels of the beacon signals to determine one or more link impairment factors, for example, a propagation loss factor, an interference factor and/or a noise factor. In a preferred embodiment, the processor is programmed to process data pertaining to variations in measured signal levels of the beacon signals to determine one or more link impairment factors, for example, a scintillation factor. In a preferred embodiment, the processor is programmed to sequentially determine the link qualities. The communications stations are, for example, UHF communications satellites or part of one or more terrestrial cellular networks.

In accordance with another embodiment of the present invention, a method of determining communication link quality employing beacon signals includes the step of: providing a machine-readable program to a processor that, when executed, enables the processor to control a communications device to process beacon signals from one or more communications stations, the beacon signals including a continuous wave (CW) tone and a coded signal that are different for each of the communications stations, to determine link quality between the communications device and the communications stations and to facilitate user selection of an available communications station that is most advantageous for communications.

The above described and many other features and attendant advantages of the present invention will become apparent as the invention becomes better understood by reference to the following detailed description when considered in conjunction with the accompanying drawings.

BRIEF DESCRIPTION OF THE DRAWINGS

Detailed description of preferred embodiments of the invention will be made with reference to the accompanying drawings.

DETAILED DESCRIPTION OF THE PREFERRED EMBODIMENTS

The following is a detailed description of the best presently known mode of carrying out the invention. This description is not to be taken in a limiting sense, but is made merely for the purpose of illustrating the general principles of the invention.

Figure 1:
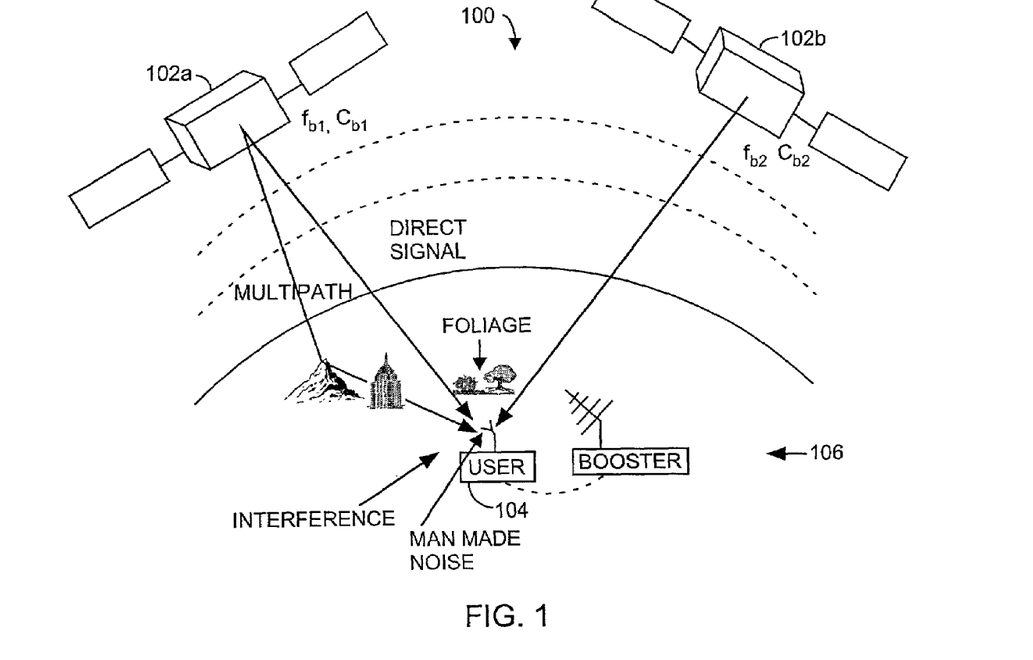
FIG. 1 is a diagram illustrating an exemplary implementation of the method of the present invention for a communications device and a plurality of communications satellites.

An exemplary implementation of the method of the present invention is suitable for a satellite communication system. FIG. 1, illustrates an exemplary UHF satellite communication system 100 and the limitations commonly found in such systems, which are addressed by the present invention. Communications satellites 102a, 102b are configured in constellations that typically provide users with two alternative satellites within the user's field of view. According to the present invention, beacons signals are broadcast from each satellite having two spectral components that are unique to each satellite. The one component is a CW signal offset from the frequencies used to communicate and having a frequency, $f_{bi}$, which differs from the CW frequency used by other satellites. The second spectral component, $C_{bi}$, is a coded waveform transmitted within the frequency band allocated for the satellites and, preferably, at a lower level than the communication signals to avoid interfering with them, and again each coded waveform is unique to a particular satellite. Thus, the beacon signals for a given satellite can be distinguished from those used by other satellites and selected in a manner that beacon signals from other satellites do not interfere with beacon signals from other satellites. An examplary preferred embodiment of the coded waveform is a pseudo-random code such as a simple shift register sequence that has well behaved autocorrelation properties.

FIG. 1 also illustrates typical UHF limitations. The earth's ionosphere is one such limitation and two distinct types of degradation can result. Because of dynamic variations of the ionospheric properties, the signal level can vary with time, a phenomena referred to as scintillation. A second degradation results from Faraday rotation that alters the polarization of signals transversing the ionosphere. Thus, the polarization of the satellite signal differs from the polarization intended by design, and this difference results in some degradation in signal reception. The signal path can be blocked by either man-made or natural terrain features and loss of signal power occurs degrading communications. Likewise, signals can be reflected from man-made or natural features resulting in multipath signal components that are delayed in time relative to the direct signal and interfere with the direct signal reception degrading communications. The UHF frequency range has numerous users in addition to those intended for this particular satellite communication system and these interfering signals can also degrade the operation of the satellite communication system. The noise level at the user's receiver is comprised of two components, the natural Galactic noise and man-made noise components. Man-made noise depends on the environment surrounding the users and with modern day urbanization, man-made noise levels commonly exceed the natural noise sources. Foliage surrounding the user also reduces UHF signals and thus, foliage attenuation degrades performance. Finally, the presence of the user and the environment surrounding the user affects the performance of the user's antenna further degrading communication performance. In such a system design according to the present invention, the user is provided with a choice of satellites for communication purposes. For example, the path to one of the satellites may be obscured by a building while the path to a second satellite is relatively clear. Because both satellites are equipped with independent beacon signals, according to the present invention the user can select the satellite that provides greater opportunity for successful communications.

The illustrated exemplary UHF satellite communication system 100 includes a user communication device 104 with its own transceiver and antenna and a booster/high-powered antenna assembly 106 that provides a means of maintaining communications in adverse environments. The booster/high-powered antenna assembly 106 includes a more directive antenna (as compared to the antenna in the communication device 104) capable of increasing user performance and has additional transmitter power to boost the signal transmitted to the satellite. In a preferred embodiment, the booster/high-powered antenna assembly 106 is configured to have a simple plug-in connection with the user's transceiver. However, if used indiscriminately, such a booster can degrade overall performance for other system users. For example, if used in relatively clear environments free from adverse conditions, the signal levels delivered to the satellite would exceed those levels needed to maintain communications. Such excessive levels can interfere with other system users degrading operation of the communication system. Thus, according to the present invention, the satellite beacon signals are also employed to provide a means for controlling the performance of the booster so that excessive performance does not degrade overall performance for other users.

Figure 2:
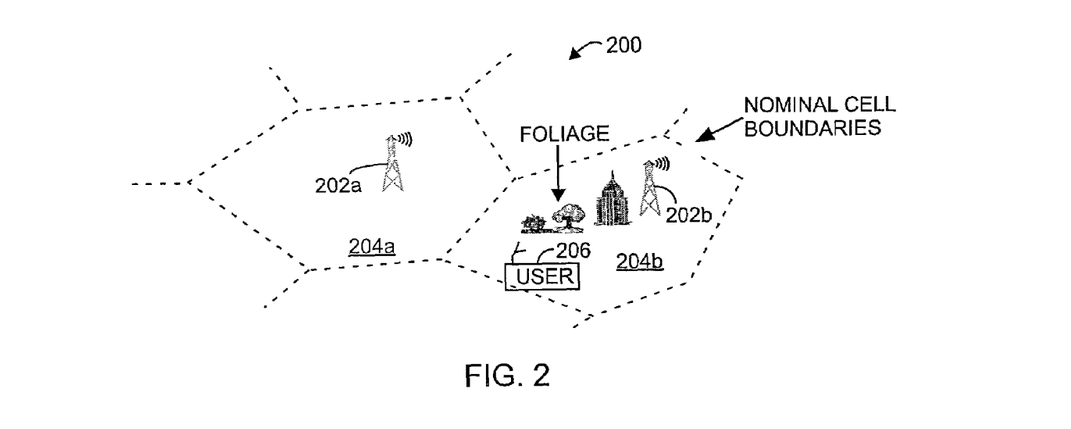
FIG. 2 is a diagram illustrating an exemplary implementation of the method of the present invention for a communications device and a terrestrial cellular network.

Other communication systems such as terrestrial cellular networks are also faced with some of the same limitations and would advantageously benefit from employing the principles of the present invention. Such a cellular system 200 is shown in FIG. 2 as a nominal cellular grid having a set of base stations 202a, 202b located within cells 204a, 204b, respectively. A user 206 within one of the cells may be blocked by a building and/or attenuated by foliage. In this case, service through a base station within an adjacent cell might provide improved communications and because the base stations would be furnished with similar independent beacon signals, the user would now be furnished with a means to select a base station that is more advantageous for communications.

When adverse communications are experienced in cellular systems, propagation limitations can be solved in particular situations. To obtain reliable communications in cellular systems, the user's transceiver can be equipped with an auxiliary jack to permit connection to a fixed antenna and amplification, similar to the booster/high-powered antenna assembly 106 of FIG. 1. Such a design can also control the transmitted power level so as to maintain communications and avoid excessive signal levels that degrade the performance of other cellular users.

Also according to the present invention, correlation of the received coded waveform with a reference replica of the code provides estimated values of the time delay components resulting from multipath. This information can be used advantageously to establish the time delay values needed in equalization. For the receiver, such equalization can be performed by an adaptive transversal filter comprised of complex weighting of time delay components. This equalization aligns the received time delay components to recover a signal undistorted by multipath. Also, an arrangement for determining the time delay for using an equalizer to mitigate the effects of multipath is disclosed in U.S. Pat. No. 5,781,845 to Dybdal et al., incorporated herein by reference. In both cases, deriving estimates of the time delay values from the coded beacon signal can be used advantageously in techniques for equalization by independently estimating the required time delay values and thus reducing the time needed to implement the equalization.

The following discussion makes reference to UHF satellite communication systems; however, it should be appreciated that the principles of the present invention are not limited to this particular application.

Figure 5:
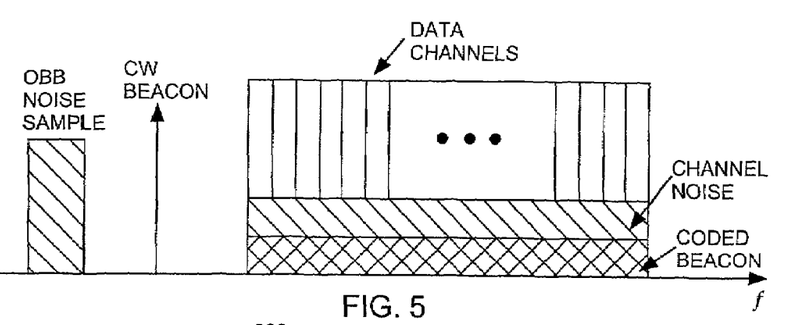
FIG. 5 is a diagram of spectra received by a communications device according to an exemplary preferred embodiment of the present invention.

According to an exemplary method of the present invention, a plurality of UHF satellites are equipped with beacon transmitters that are designed to broadcast two types of signals to users of communications devices distributed over the earth's field of view. One of these signals is a CW tone, and the second type of signal is a low-level coded tone that preferably occupies the same bandwidth as the communication service. Referring to FIG. 5, which shows spectra received by a communications device according to an exemplary embodiment of the present invention, the CW tone (denoted "CW Beacon") is preferably separated from the bandwidths used by the communication traffic to avoid interference and loss of communication capacity. According to the present invention, the amplitude of the tone is controlled with sufficient accuracy to allow users to accurately measure link loss and scintillation, and the frequency of the tone is controlled with sufficient accuracy to permit users to measure their Doppler offsets. The second beacon signal (denoted "Coded Beacon") is coded to span the communication signals broadcast by the satellite and is transmitted at a sufficiently low level that the coded signal will not interfere with normal communications traffic. This signal is coded in a way that is known to the beacon transmitter and to the user receivers to afford protection from interference. Unlike other applications for satellite beacons that use CW tones, the present invention involves transmitting two types of signals, one a CW tone that is out of band and the second a coded signal within the communications bandwidth.

Figure 3:
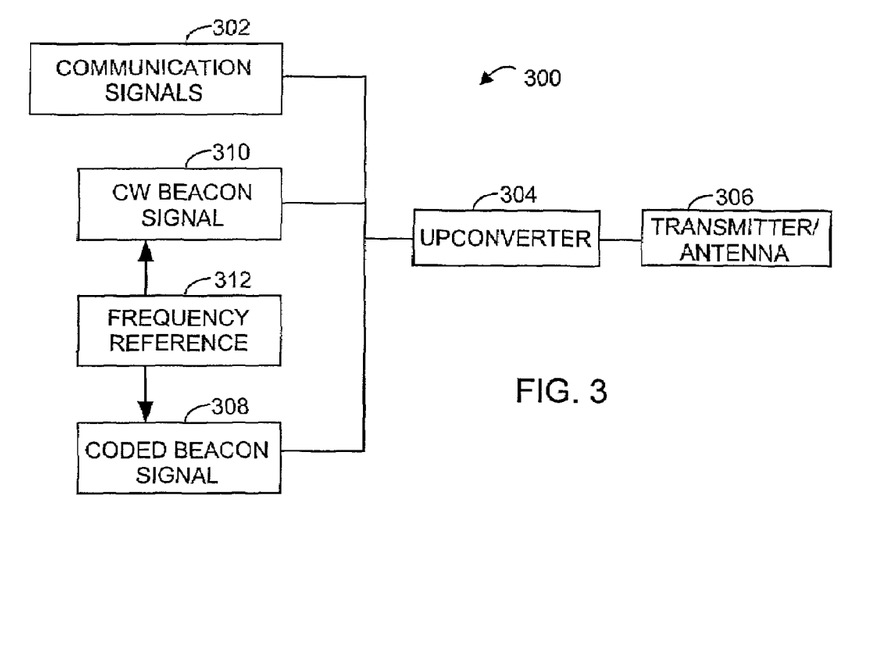
FIG. 3 is a functional block diagram of an exemplary space segment according to the present invention.

FIG. 3 is a functional block diagram of an exemplary space segment 300 according to the present invention. The illustrated space segment 300 includes the normal communication signals 302 that are upconverted 304 to the transmit frequency, amplified to the transmitter output level, and routed to the downlink antenna 306 for transmission. The two beacon signal components 308, 310 are multiplexed with the communication signals 302. The CW beacon signal 310 is derived from a stable frequency reference 312 that is a normal part of the communication satellite transponder. The coded beacon signal 308 also uses this same frequency reference 312 in addition to the coded waveform that spans the downlink frequency allocation. Using the same frequency reference is advantageous because the CW beacon 310 detection assists in acquiring the coded beacon signal 308. More specifically, acquisition of the CW tone 310 corrected for Doppler offset provides the carrier reference for the coded beacon, which reduces the acquisition time for the coded beacon signal 308. Likewise, the CW beacon 310 facilitates determination of the Doppler offsets for UHF users located on moving platforms or in the event of satellites that are not in a geosynchronous orbit. In both cases, the Doppler offsets are significant because of the narrow channel assignments that subdivide the UHF frequency allocation.

Figure 4:
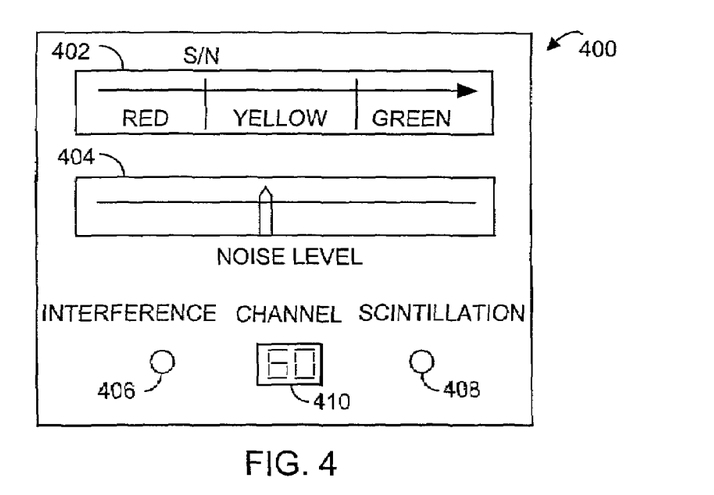
FIG. 4 is an exemplary display suitable for employment with a communications device according to the present invention.

A display for the user's communications device according to the present invention can take a variety of different forms, but generally includes a plurality of different fields that are preferably dedicated to and controlled by a processor to provide visible (or other human-perceivable, e.g., audible, vibrating) indicia of link impairment and/or other information. Referring to FIG. 4, an exemplary display 400 suitable for employment with a communications device includes a signal-to-noise (S/N) meter 402, with red, yellow, and green zones, a noise level meter 404, an interference indicator light 406, a scintillation indicator light 408, and channel display 410 configured as shown. In the illustrated exemplary display 400, the S/N meter 402 and the noise level meter 404 comprise analog displays. The signal-to-noise ratio can be formed from the CW beacon power level and the noise level within the channel intended for system use or the noise power sampled from the out-of-band portion removed from the CW beacon signal. The signal to noise levels can be ratioed with the noise levels when the receiver is terminated with a matched load. The ratio of these quantities is advantageous because absolute power levels are not required but rather a ratio that is independent of the receiver gain variations. In this example, the red, yellow, and green scales indicate when communication (link closure) is not possible, uncertain, and possible, respectively, allowing the user to intuitively determine communication feasibility. These zones can be repeated for different data rates allowing the user to determine the possibility of alternative services.

The separate noise level indicator 404 provides the user with an indication that communication may be limited by local noise. Such an indication is beneficial when the noise is locally generated, e.g., one noise source may be ignition noise from a vehicle and simply walking away from the vehicle may lower the noise sufficiently to allow communications. The separate displays 406 and 408 indicate the presence of interference and scintillation, respectively, advising the user of these link impairments. The channel display 410, comprising light-emitting-diode (LED) or any other display technology, provides a visible indication of what channel (defined or otherwise) is being evaluated. It should be appreciated that other forms of the display 400—whether providing more or less information—are also within the scope of the present invention.

Figure 6:
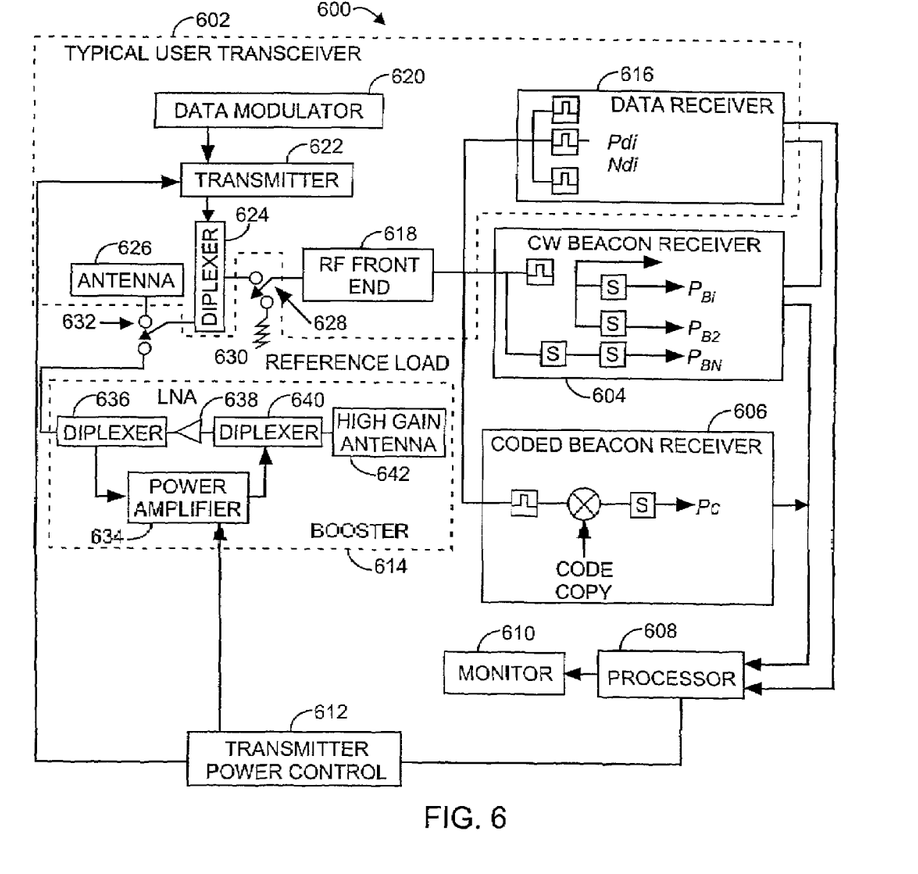
FIG. 6 is a functional block diagram of a communications device modified according to an exemplary preferred embodiment of the present invention.

FIG. 6 is a functional block diagram of a communications device that has been modified/augmented according to an exemplary preferred embodiment of the present invention to provide a user terminal equipment system 600 that, inter alia, receives and processes the beacon signals. The illustrated exemplary system 600 includes a communications device 602, a CW beacon receiver 604, a coded beacon receiver 606, a processor 608, a monitor 610, a transmitter power control 612, and a booster system 614 configured as shown. The illustrated exemplary communications device 602 includes a data receiver 616, a RF front end 618, a data modulator 620, a transmitter 622, a diplexer 624, and an antenna 626 configured as shown. A switch 628 interconnects the RF front end 618 to either the diplexer 624 or a reference load 630 depending upon the position of the switch 628 as controlled by the processor 608. Another switch 632 interconnects the diplexer 624 to either the antenna 626 or the booster system 614 depending upon the position of the switch 632 as controlled by the processor 608.

The processor 608 is programmed to control the communications device 602, the CW beacon receiver 604, the coded beacon receiver 606, the monitor 610 (to provide the user display 400), the transmitter power control 612, the booster system 614, and the switches 628, 632, and to process data from the CW beacon receiver 604, the coded beacon receiver 606 and the data receiver 616 in order to identify link impairment factors. The measured signal level provides several measures. The signal level provides a means of determining propagation loss, which can arise from several factors. Losses in the atmospheric path, losses caused by polarization conversion, losses caused by terrain and man-made structure blockage, and losses in foliage contribute to the measured loss. Changes in the location of communication equipment to reduce the last two loss factors allow users to seek a more favorable location as indicated by the signal level measurements. The variation in the measured signal power (or variation in the measured signal level) indicates scintillation that degrades signal performance. This scintillation can arise from the ionospheric path or from multipath fading and again system performance is degraded. Monitoring these fluctuations at alternative locations, i.e., by viewing the monitor while moving the receiver, can help reduce the degradation caused by multipath fading. The signal levels of the CW tone and the coded signal can also be compared. The ratio of the two signal levels should have a fixed value. If the signal levels do not have the predetermined ratio (known nominal measured ratio taken in an interference free environment), the presence of interference is indicated. Interference within the bandwidth intended for the user's communication can be determined by measuring the noise level near the out of band CW tone and within the bandwidth intended for communications. Both Galactic and manmade noise levels have significant variation at UHF frequencies, but what is important for communication availability is the ratio of signal and noise powers. Preferably, the measured noise power is used as a reference for the measured signal powers (i.e., S/N ratio). In this way, the link quality can be directly judged. Additionally, such a measurement is a relative one that can be made more accurately than an absolute one because the gain variations of the user equipment are removed by ratioing the signal and noise levels.

With regard to signal and noise measurements, the CW signal is out of band and its power can be measured by two separate techniques. A simple power meter can be used, but this measurement responds to the total power within the bandwidth including the tone power, noise power, and possibly interference power. The tone power can also be measured by squaring and integrating using a carrier recovery loop. In this way, noise components that occur in a power measurement are removed permitting high sensitivity measurements. The coded signal level is measured by correlating the received signal with a code replica present in the user's equipment. In these measurements, the integration time should be selected to be shorter than the fluctuation time of the scintillation so that variations caused by scintillation are not averaged and can be observed. The noise level near the out-of-band CW tone is also measured. The noise level within the user's intended bandwidth can also be measured to determine if the bandwidth is otherwise occupied.

The illustrated exemplary booster system 614 includes a power amplifier 634, a diplexer 636, a low-noise amplifier (LNA) 638, a second diplexer 640, and a high gain antenna 642 configured as shown. The booster system 614 provides a more directive antenna 642 than the antenna 626 with the communications device 602 (e.g., user's handset). An exemplary preferred antenna 642 for the booster system 614 is a log periodic antenna that can be inexpensively constructed. In addition to providing increased gain, the separate antenna 642 also provides isolation from the user avoiding antenna degradation such as body absorption. The diplexers 636, 640 at both the input and output allow separation of the additional power amplifier and preamplifier. According to the present invention, the received beacon power can also be used to control the user's uplink transmitted power level to avoid excessive signal levels that can degrade the performance of other users. By this means, the dynamic range of received signal levels at the satellite is reduced.

In addition to determining link quality measures, by measuring the CW tone, Doppler offsets relative to the user can be determined. Compensation of these Doppler offsets provides a means of confining communications within the desired spectrum reducing interference to other system users. Lack of either signal or noise power measurements indicates malfunction of the user's receiver complementing Built-In Test Equipment (BITE) capabilities.

Figure 7:
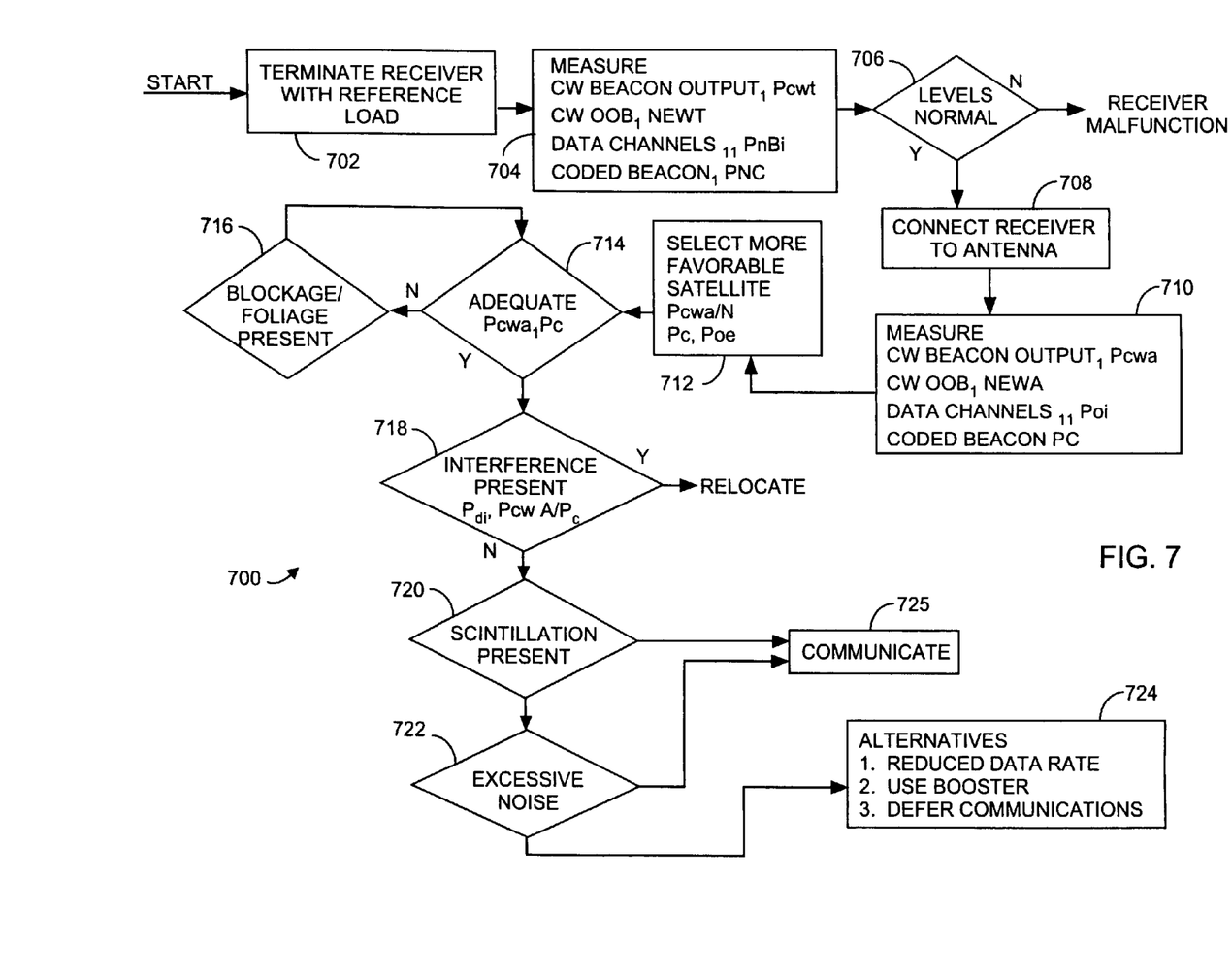
FIG. 7 is a flowchart illustrating a method of determining communication link quality employing beacon signals according to an exemplary preferred embodiment of the present invention.

FIG. 7 is a flowchart illustrating a method 700 of determining communication link quality employing beacon signals according to an exemplary preferred embodiment of the present invention. Operation of the equipment system 600 can follow the steps of this exemplary method 700. At step 702, the receiver is terminated in the reference load 630 in order to establish the noise levels that are used as reference values in the subsequent determination of communication feasibility. With this termination, the receiver should respond to only the noise power, and the noise levels provide a set of reference levels used in subsequent decisions for operation. In practice, some variation of the absolute noise levels will be experienced because of the normal drift in the electronics gain values. However, such variation is relatively minor, probably less than 2 dB for practical designs. Variation beyond these levels indicates receiver malfunction. At step 704, the measured noise levels are: the noise level output from the CW beacon receiver, the noise level from the out-of-band (OOB) noise level adjacent to the CW beacon frequency, the noise levels in the data channels, and the noise level for the beacon coded signal correlator, which should be zero because the noise input to the receiver when terminated is not correlated with the code. At step 706, the consistency of these noise values is observed and a determination is made as to whether the receiver is malfunctioning. If it is determined that the noise levels are normal; and, therefore, the receiver is not malfunctioning, then at step 708 the receiver is switched to the antenna.

At step 710, the beacon power levels are remeasured at the same points when the receiver is connected to the antenna rather than the reference load. These signal levels are compared to the levels established by the noise measurements. The signal levels include those for both (all) satellites within the field of view and the alternative data channels available for communication with each. Again, because of the use of the reference load and ratioing the measurements with the noise values, only relative rather than absolute signal levels are required in the present invention. The CW beacon outputs indicate the received power from each satellite and differences in these levels allow determining the more favorable satellite for use. The CW power measurements can be made using different integration times and observations (about particular defined channels, for example) can be made sequentially. If the received beacon power is constant with time, scintillation and multipath fading are not present. Fluctuations in the power levels indicate multipath and/or scintillation; ionospheric scintillation is generally more rapid than multipath fading, and thus, by using different integration times the two effects can be separated. During this time, the coded beacon receiver 606 will undergo acquisition and its output similarly can be observed for different integration times to identify scintillation and multipath. In addition, one feature of the correlation processing used with the coded beacon is that it responds only to the coded signal and does not respond to either noise or interfering signals because these signals are not correlated with the code. By contrast, the CW beacon receiver responds to three possible signal components, the CW beacon signal of interest, noise components, and possible interference. Thus, the coded beacon is advantageous because its output is independent of interference signals. Variations in the coded correlation indicate the presence of scintillation and/or multipath, and differences in the rate of variation of the correlation outputs allow distinguishing the limitations.

At step 712, the measurements made in the previous steps are used to decide on the ability to use the system for communications. For example, a determination is made as to which of two satellites within the field of view afford the best opportunity for communications. This decision can be made by examining the CW beacon power received from both satellites and the signal powers in the data channels shared between the satellites.

The possibility exists that interference is present in the CW beacon signals; the presence of interference at this point is indicated by abnormally high signal levels detected at the beacon frequencies. In this event, the coded beacon power that is uncorrelated with interference and noise components can be used to determine the satellite that is most favorable for communications.

At step 714, the next decision is to determine if the beacon signals have adequate strength to allow communications. The output of the CW and coded beacons are used for this purpose. The difference between the power levels of these two beacons also provides useful information. The CW beacon signal is comprised of three components, the signal, noise, and possible interference, while the coded beacon signal has only one component, the beacon signal because of the correlation benefits of the code. A ratio of these power levels indicates the presence of interference and/or excess noise. The beacon signals can also be used as a real time indicator of signal deficits. At step 716, the user can relocate to determine if manmade or terrain blockage is reducing the received beacon power. Foliage can also attenuate signals and relocating to a more favorable spot can increase the received beacon signal. Similarly, for handheld terminals, the beacon reception can be improved by some realignment of the terminal to reduce body absorption or antenna pattern degradation effects that degrade communications. Thus, the satellite beacons can be advantageously used to assist the user in determining a terminal location that allows a more favorable chance of communications.

At step 718, the potential presence of interference is addressed. Interference can limit system operation in several areas. The reception of interference in the CW beacon, the OOB CW noise sample, or the data channels can all limit terminal operation. The ratio of the CW and beacon power densities incident on the earth's surface is established in the satellite design. Without interference, the user should observe approximately the same ratio, and an excessive CW power level indicates interference at the CW frequency. Similarly, the OOB noise sample should vary over a credible range of antenna temperatures, and power levels in excess of this range indicate interference. Because noise generally has a broad bandwidth, the noise levels in the data channels should be similar to the OOB values, a further indication to identify interference in the OOB sample. The data channels themselves can have signal levels comprised of normal system traffic, interference, and noise. A search through several of these channels should reveal the levels of the composite signals within each. The channels are allocated between the satellites to avoid mutual interference between users. Thus, the channel assignments between the two satellites within the field of view are known, and differences in received signal levels indicate channels being used, those with interference, and those containing only noise. A second source of interference that is observed by the user receiver is local terrestrial interference. Thus, the user should be able to find a channel that contains only noise to determine a reference level and also monitor the channel intended for use to determine if it is occupied, contains interference, and/or has a determinable noise level.

At step 720, the potential presence of scintillation is addressed. Scintillation is another link limitation and can arise from the ionospheric variation or from multipath. Monitoring both the CW and coded beacons over a time interval is used to determine the presence of interference. The received signal level variation of signal samples during the time interval indicates scintillation. If the signal level is steady, scintillation is minimal. The range of signal powers during the measurement intervals defines the amount of fading that can be translated to the anticipated loss in communication performance. The coded beacon signal will also have a reduced level because scintillation reduces the correlation of the beacon signal. Thus, another indication of scintillation lies with the ratio of the received CW and coded beacon signals. Multipath can be further distinguished by distinct peaks in the correlation response of the coded beacon.

At step 722, the potential presence of excessive noise is addressed. Excessive noise, typically from man-made sources, is another limitation. This noise level as described is determined from the OOB sample offset from the CW beacon and/or from those data channels that are not being used and do not contain interference. The noise levels are derived from the reference noise level when the receiver is terminated in a reference load, the noise level determined when the receiver is connected to the antenna, and the receiver noise temperature that is determined a priori.

Having followed the above-described process, at steps 724 and 725 a decision is made with regard to the feasibility for communications. At this point, a data channel that is not occupied with other users or interference can be determined from the observed received signal level; this level should correspond to a credible antenna temperature. The signal level and the noise level have been established by the measurements. The amount of signal fading caused by ionospheric scintillation has also been determined. Thus, an estimate of the signal-to-noise ratio burdened by fading loss is established; this is one of the parameters indicated by the display 400. At this point, four possible outcomes exist: (1) communications are feasible, (2) communications at a reduced rate are feasible, (3) the use of a booster system is required, or (4) communications are not feasible at this time.

The display 400 is part of means for identifying these determinations (outcomes) and prompting user actions. For example, if the signal-to-noise (S/N) meter 402 is green at the monitor 610, the user can proceed with communications. If the signal-to-noise (S/N) meter 402 shows yellow, several alternatives are available. One alternative is to relocate to avoid blockage to the satellite path by buildings or foliage, or move away from the handset to reduce body absorption. The monitor 610 allows the user to observe changes in signal level and determine if relocation can allow communications. The user may also select the option of a reduced data rate service and thus reevaluate the possibility of communications. A further option is to use the booster system 614; attachment of the user terminal to the booster system 614 allows reassessment of communication options. Finally, if the monitor 610 is well within the red zone of the signal-to-noise (S/N) meter 402 in spite of the user's actions, then communication from the user's location is not feasible.

Figure 8:
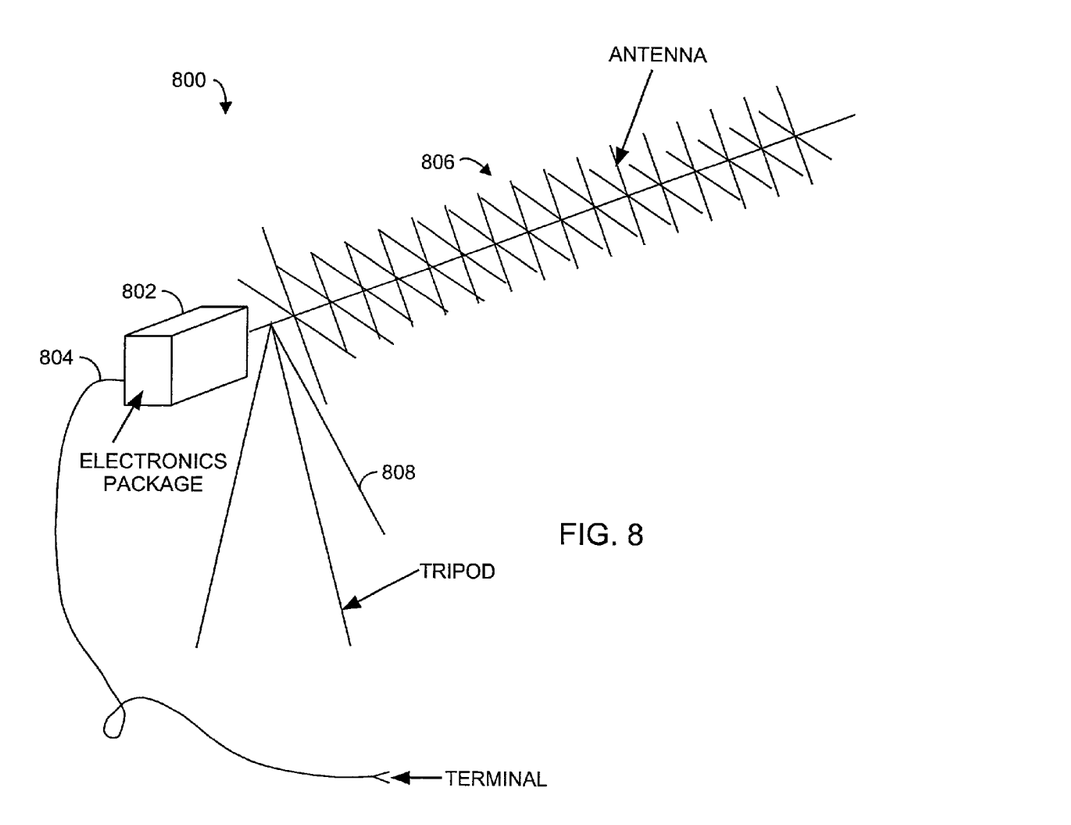
FIG. 8 shows an exemplary booster/high-powered antenna assembly according to the present invention.

FIG. 8 shows an exemplary booster/high-powered antenna assembly 800 according to the present invention. The booster component of the assembly 800 comprises an electronics package 802 containing a power amplifier, a low-noise amplifier, two diplexers (as discussed with reference to FIG. 6), and an input cable 804 connecting the existing transceiver and control cable for the power amplifier (as discussed with reference to FIG. 6), an antenna 806, and a tripod 808 or other mechanism to support and position the antenna 806. The booster enhances the terminal performance by providing an antenna having a higher gain performance than the existing transceiver and a higher transmitter power level. A variety of antennas could be used such as the Yagi design shown in FIG. 8. Because of its increased size, higher gain results boosting the received signal level on both received and transmit modes and providing circular polarization. Because the antenna 806 is separated from the user, body absorption degradation from the presence of operators is avoided and, where concerns of RF radiation hazards exist, this separation advantageously allows a higher transmitter level than can be accommodated by the user terminal itself. The connecting cable 804 has a control interconnection with the transceiver's processor to prevent excessive transmitted power when link impairments are minimal.

Figure 9:
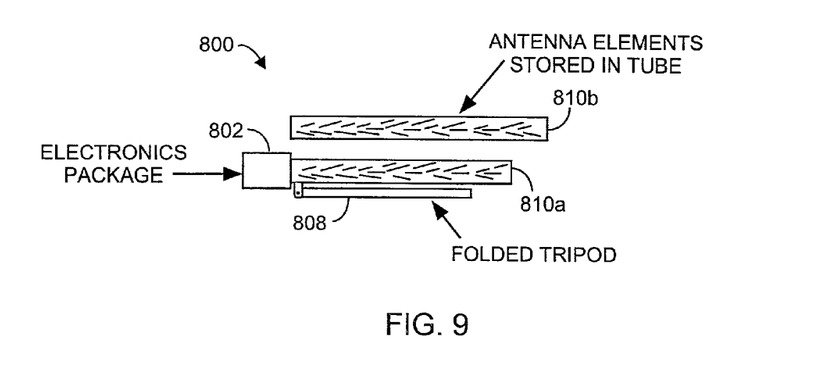
FIG. 9 shows an exemplary embodiment of the booster/high-powered antenna assembly in a disassembled configuration with elements of the antenna collapsed and separately fitted into storage containers.

FIG. 9 shows the booster/high-powered antenna assembly 800 in a disassembled configuration with elements of the antenna collapsed and separately fitted into storage containers 810a, 810b, which provide means for storing the antenna for transit. An exemplary preferred antenna, particularly for long UHF wavelengths, comprises a plurality of sections that are configured to be assembled together, for example, using ferrules in the same manner as with a fly rod. The illustrated antenna sections each embody an arrangement where the elements comprising the Yagi antenna are spring loaded and collapse against the central axial element much like the ribs in an umbrella. In this way, the antenna can be stored for transit in, for example, a tube. When removed from the tube, the spring-loaded designs deploy the elements for operation.

In operation, the booster would be deployed and assembled from the elements in the shipping cases. While the antenna has a higher gain than the existing user terminals, its beamwidth is relatively broad requiring pointing only in the general direction of the satellite. When two satellites are in view, an alignment alternatively between the satellites can determine a more favorable communication opportunity. When operations are complete, the antenna elements can be retained within the shipping tube, the tripod collapsed, and a relatively compact package for transit is obtained.

Although the present invention has been described in terms of the preferred embodiment above, numerous modifications and/or additions to the above-described preferred embodiment would be readily apparent to one skilled in the art. It is intended that the scope of the present invention extends to all such modifications and/or additions.

We claim:

1. A method of determining communication link quality employing beacon signals, the method comprising the steps of:
   equipping a plurality of communications satellites with beacon transmitters that generate beacon signals including a continuous wave (CW) tone and a coded signal that are different for each of the communications satellites;
   providing a communications device, that is capable of establishing UHF communications links with the communications satellites by means of a first antenna, with means for receiving and processing the beacon signals to determine the quality of the UHF communications links;
   providing the communications device with means for communicating to a user information pertaining to the quality of the UHF communications links and identifying individual component impairments of a total link degradation; and
   providing the communications device with a means for adjusting a transmission power of the communications device;
   wherein the means for adjusting transmission power comprises a booster device that includes an alternative high gain antenna.

2. The method of determining communication link quality employing beacon signals of claim 1, wherein for each of the communications satellites:
   the coded signal is within a communications bandwidth employed by the communications satellite; and
   the CW tone is out of the communications bandwidth.

3. The method of determining communication link quality employing beacon signals of claim 1, wherein the communication device comprises a transponder.

4. The method of determining communication link quality employing beacon signals of claim 1, wherein the communication device comprises at least one of a mobile voice communicator and a mobile data communicator.

5. The method of determining communication link quality employing beacon signals of claim 1, wherein the means for receiving and processing the beacon signals comprises a processor.

6. The method of determining communication link quality employing beacon signals of claim 1, wherein the means for receiving and processing the beacon signals comprises one or more beacon receivers.

7. The method of determining communication link quality employing beacon signals of claim 6, wherein the one or more beacon receivers comprise a continuous wave (CW) tone beacon receiver.

8. The method of determining communication link quality employing beacon signals of claim 6, wherein the one or more beacon receivers comprise a coded signal beacon receiver.

9. The method of determining communication link quality employing beacon signals of claim 1, wherein the means for communicating information provides a real time indication of link quality.

10. The method of determining communication link quality employing beacon signals of claim 1, wherein the means for communicating information comprises a display device operably interconnected to the communications device.

11. The method of determining communication link quality employing beacon signals of claim 1, wherein the information includes noise information.

12. The method of determining communication link quality employing beacon signals of claim 1, wherein the information includes interference information.

13. The method of determining communication link quality employing beacon signals of claim 1, wherein the information includes scintillation information pertaining to scintillation caused by multipath or ionospheric effects.

14. The method of determining communication link quality employing beacon signals of claim 1, wherein the alternative high gain antenna is a log periodic antenna.

15. The method of determining communication link quality employing beacon signals of claim 1, wherein the alternative high gain antenna is a Yagi antenna.

16. The method of determining communication link quality employing beacon signals of claim 1, wherein the alternative high gain antenna is articulated so that it can be manipulated as desired into an opened operating configuration or a collapsed storage configuration.

17. The method of determining communication link quality employing beacon signals of claim 1, further comprising the step of:
   correlating a received coded signal with a reference signal to provide estimated values of time delay components resulting from multipath for establishing time delays values in equalization.

* * * * *